(12) United States Patent
Khoury (10) Patent No.: US 9,283,834 B1
(45) Date of Patent: Mar. 15, 2016

(54) CUSTOMIZED VEHICLE SHIELDING SYSTEM

(71) Applicant: Johnny Michel Khoury, Al Metn (LB)

(72) Inventor: Johnny Michel Khoury, Al Metn (LB)

( * ) Notice: Subject to any disclaimer, the term of this patent is extended or adjusted under 35 U.S.C. 154(b) by 0 days.

(21) Appl. No.: 14/627,547

(22) Filed: Feb. 20, 2015

(51) Int. Cl.
| | |
|---|---|
| *B60J 11/04* | (2006.01) |
| *F41H 5/06* | (2006.01) |
| *F41H 7/02* | (2006.01) |
| *G09F 21/04* | (2006.01) |
| *B60J 9/00* | (2006.01) |
| *B62D 35/00* | (2006.01) |

(52) U.S. Cl.
CPC .. *B60J 9/00* (2013.01); *B60J 11/04* (2013.01); *B62D 35/00* (2013.01); *F41H 5/06* (2013.01); *F41H 7/02* (2013.01); *G09F 21/048* (2013.01)

(58) Field of Classification Search
CPC ............... F41H 7/00; F41H 7/02; F41H 7/04; F41H 5/06; B60J 11/00; B60J 11/02; B60J 11/025; B60J 11/04; B60J 11/06; B60J 11/08; G09F 21/048; G09F 21/04
USPC ............. 296/136.01, 136.02, 136.11–136.13, 296/136.05, 97.4, 97.7, 187.07; 89/36.07, 89/36.08, 36.09
See application file for complete search history.

(56) References Cited

U.S. PATENT DOCUMENTS

| | | | | | |
|---|---|---|---|---|---|
| 4,720,135 A | * | 1/1988 | Farina | ....................... | B60J 11/02 293/117 |
| 4,966,406 A | * | 10/1990 | Karasik | .................... | B60J 11/00 296/136.02 |
| 5,022,700 A | * | 6/1991 | Fasiska | ..................... | B60J 11/02 160/26 |
| 5,056,839 A | * | 10/1991 | Yoon | ......................... | B60J 11/02 150/166 |
| 5,230,545 A | * | 7/1993 | Huang | ...................... | B60J 11/00 160/370.21 |
| 5,294,170 A | * | 3/1994 | Hsueh | ....................... | B60J 11/02 296/136.02 |
| 5,433,499 A | * | 7/1995 | Wu | ............................ | B60J 11/02 296/136.02 |
| 5,746,469 A | * | 5/1998 | Nonaka | ................... | B60J 1/2088 296/97.4 |
| 5,762,393 A | * | 6/1998 | Darmas, Sr. | ........... | B60J 11/025 296/136.01 |
| 5,902,003 A | * | 5/1999 | Hindson | ................... | B60J 11/02 293/128 |
| 6,120,085 A | * | 9/2000 | Wooldridge | ............... | B60J 3/02 296/97.4 |
| 6,276,742 B1 | * | 8/2001 | Deng | ........................ | B60J 11/00 160/370.21 |
| 6,407,365 B1 | * | 6/2002 | De Prete, III | .......... | B60J 1/2011 160/370.21 |
| 6,464,446 B1 | * | 10/2002 | Hurler | ....................... | B60P 1/02 414/495 |
| 6,935,674 B1 | * | 8/2005 | Campos | .................... | B60J 11/00 296/136.1 |
| 7,137,661 B2 | * | 11/2006 | Neuer | ..................... | B60J 11/025 160/370.22 |
| 7,252,321 B2 | * | 8/2007 | Lee | ......................... | B60J 1/2025 160/370.22 |
| 7,562,928 B1 | * | 7/2009 | Morazan | ................... | B60J 11/00 296/136.01 |
| 7,967,366 B1 | * | 6/2011 | Tellez | ....................... | B60J 11/02 296/136.02 |
| 8,419,107 B2 | * | 4/2013 | Manchanda | ............. | B60J 11/06 296/136.1 |
| 8,684,444 B2 | * | 4/2014 | Dao | ......................... | B60J 11/02 296/136.01 |

* cited by examiner

*Primary Examiner* — Gregory Blankenship
(74) *Attorney, Agent, or Firm* — Moser Taboada (57) ABSTRACT

The present invention relates to a customized vehicle shielding system used for shielding at least a part of a vehicle, wherein such system essentially comprises a housing with a plurality of walls, a shielding material adapted to alternate between an extended position and a retracted position, a mechanism for extending and retracting the shielding material, and draining means. A user can operate the system of the present invention remotely. The vehicle shielding system of the present invention has self-cleaning capability.

14 Claims, 15 Drawing Sheets

CUSTOMIZED VEHICLE SHIELDING SYSTEM

BACKGROUND OF THE INVENTION

1. Field of the Invention

The present invention relates to an automated vehicle shielding system for the protection of vehicles from certain external conditions.

2. Description of the Related Art

The use of shielding and shading systems and devices is well known in the prior art. For instance, numerous patents and patent applications disclose various shading devices and systems used to provide shading and protection for vehicles' windshields.

As an example, the U.S. Pat. No. 8,419,107 provides a retractable vehicle shade including a hollow central box, a front sliding panel, and a rear sliding panel. The hollow central box is mounted on a rooftop of the vehicle. The front sliding panel is slidingly fitted into the box through a slot at the front end and configured to cover at least front glass pane. The rear sliding panel is slidingly fitted into the box through the slot at the rear end and configured to cover at least rear glass pane. The vehicle shade can further include a detachably attached waterproof stretchable fabric member for providing a layer over respective panels and central box. The fabric member has one or more elastic members which causes it to fold up along the end portions of the sliding panels on the top of box, when the panels are retracted backwards into the box.

The U.S. Pat. No. 7,562,928 discloses an automated vehicle sunshade that includes a compartment mountable to a roof of a vehicle, a flexible shade, a plurality of rods coupled to the flexible shade and a drive device coupled to the plurality of rods. The plurality of rods is retractable and extendable so that the sunshade repeatedly alternates between an extended position and a retracted position. In the retracted position, the flexible shade, plurality of rods and drive device are enclosed within the compartment. The sunshade also includes guide wires and support wires for properly guiding and supporting the flexible shade during retracting and extending.

In another US patent having the U.S. Pat. No. 6,407,365, there is provided an automated sunshade and defrosting assembly for protecting automotive interior surfaces and decreasing windshield defrosting time, wherein such assembly includes a pair of tracks designed for coupling on opposite sides of a vehicle's windshield. A sunshade member extends between the pair of tracks. The sunshade is extendable into an extended position defined by the sunshade covering the windshield. The sunshade is retractable into a retracted position defined by the sunshade uncovering the windshield. A heating element extends through the sunshade for selectively heating the windshield for preventing frost buildup on the windshield. A control unit is provided for selectively extending and retracting the sunshade between the extended and retracted positions.

None of the prior art documents provide an automated vehicle shielding system that could be built-in or added-on while protecting the vehicle from certain external conditions without affecting aesthetics of the vehicle, but maintaining or improving the vehicle's aerodynamics, and that is easy to operate.

Furthermore, none of the prior art documents provide an automated vehicle shielding system that can be installed on all vehicle sizes.

SUMMARY OF THE INVENTION

Therefore, it is an object of the present invention to provide an automated vehicle shielding system that is adapted to be either built-in or added-on to the vehicle, simple to operate, customizable to adapt to all vehicle shapes and sizes and does not affect the aerodynamic characteristics of said vehicles.

It is another object of the present invention to provide a customized vehicle shielding system that does not affect the vehicle's aesthetics.

As an aspect of the present invention, there is provided a customized vehicle shielding system that protects the shielded part of the vehicle from external conditions.

In another aspect of the present invention, there is provided a customized vehicle shielding system that has a self-cleaning capability.

As another aspect of the present invention, there is provided an automated vehicle shielding system comprising essentially a housing with a plurality of walls, wherein at least one of such walls is adapted to move between an open position and a closed position; a shielding material adapted to alternate between an extended position and a retracted position; a mechanism for alternating the shielding material between the extended and retracted positions; a draining means; and means for providing self-cleaning capability.

As another aspect of the present invention, there is provided a customized vehicle shielding system that is operated by the user remotely just as it may be operated manually in case of malfunction.

Preferably, said housing encloses the shielding material and the mechanism for extending and retracting the shielding material.

Preferably, said mechanism for extending and retracting the shielding material comprises at least one movable member, at least one actuator with a coupling mechanism, and a control unit.

Preferably, said at least one actuator moves said at least one movable member.

Preferably, at least a part of said shielding material is connected to said at least one movable member.

Preferably, said shielding material is detachable.

Preferably, said at least one movable member alternates the shielding material between the extended and retracted positions.

Preferably, said at least one movable member is adapted to avoid causing damage, such as scratches, to the vehicle's body.

Preferably, said shielding material may have solar absorbing capability.

Preferably, said shielding material may provide bullet-proofing.

Preferably, said means for providing self-cleaning capability comprises at least one sweeping member installed along the length of said hollow housing.

Preferably, said means for providing self-cleaning capability comprises at least two sweeping members installed along the length of said hollow housing.

BRIEF DESCRIPTION OF THE DRAWINGS

The invention will be described with reference to the accompanying drawings, which illustrate a preferred embodiment of the present invention without restricting the scope of the invention thereof, and in which.

DETAILED DESCRIPTION OF THE INVENTION

Figure 1A:
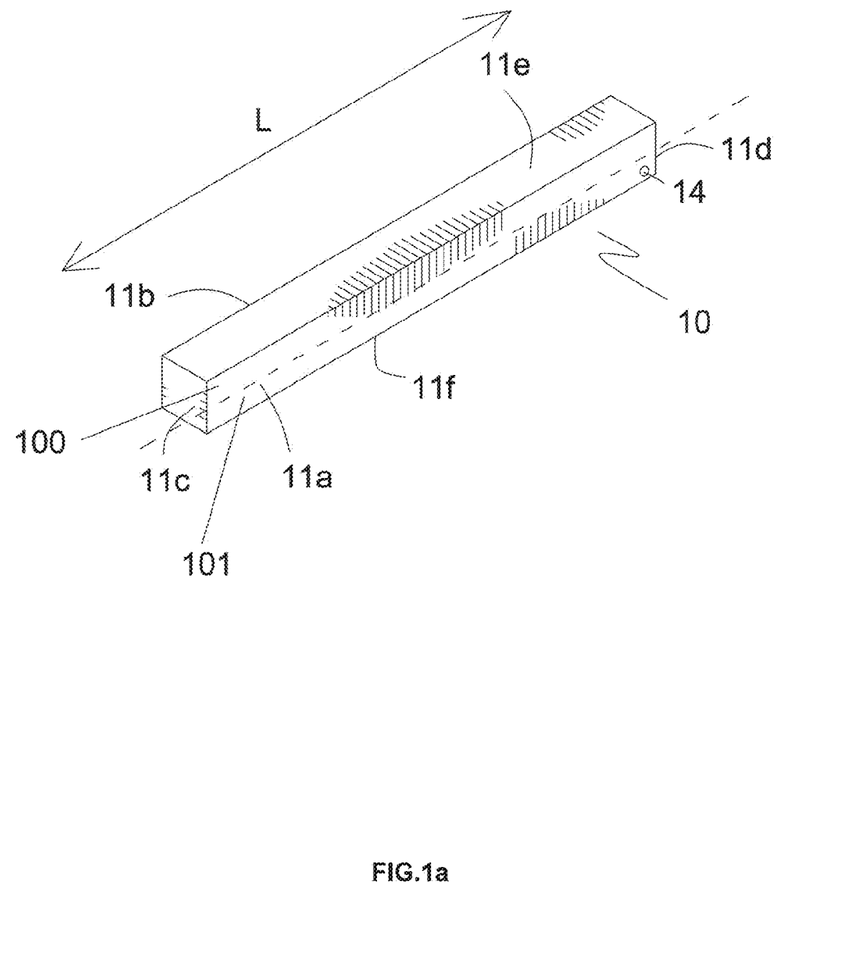
FIG. 1a illustrates a schematic diagram of an automated vehicle shielding system in a retracted position, configured according to a preferred embodiment of the present invention, wherein all walls of a hollow housing are in a closed position.
Figure 1B:
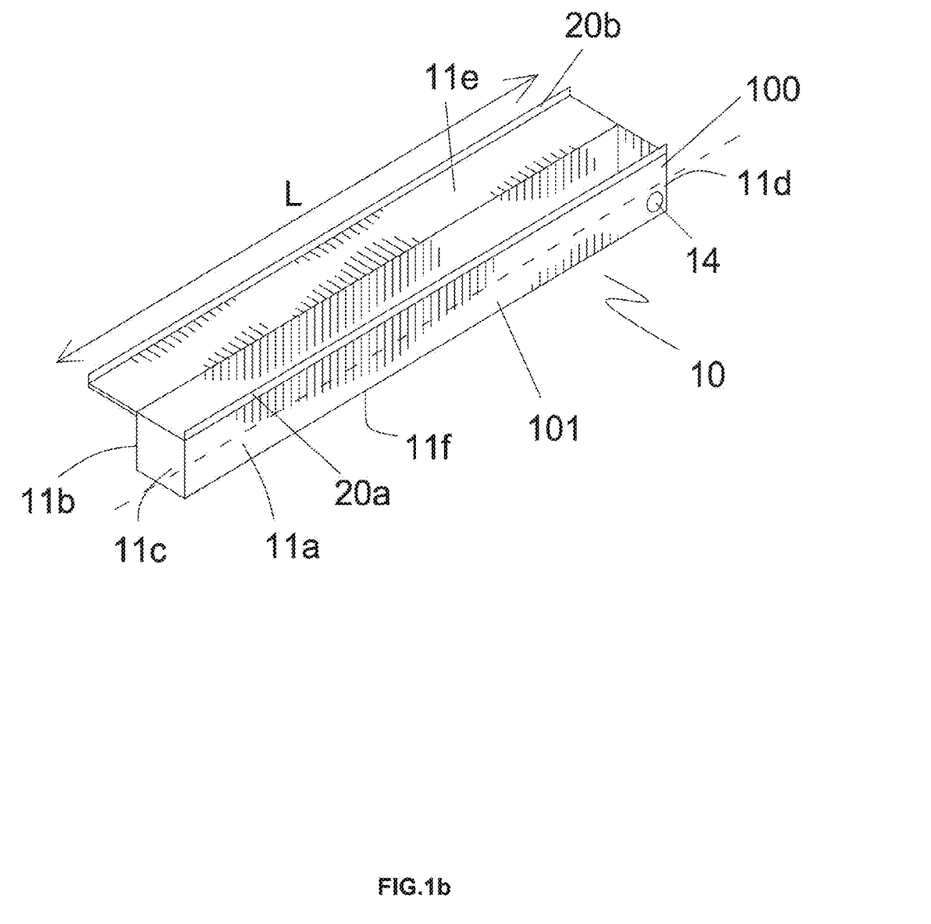
FIG. 1b illustrates a schematic diagram of an automated vehicle shielding system in a retracted position, configured according to a preferred embodiment of the present invention, wherein a wall of a hollow housing cover is in an open position.
Figure 2A:
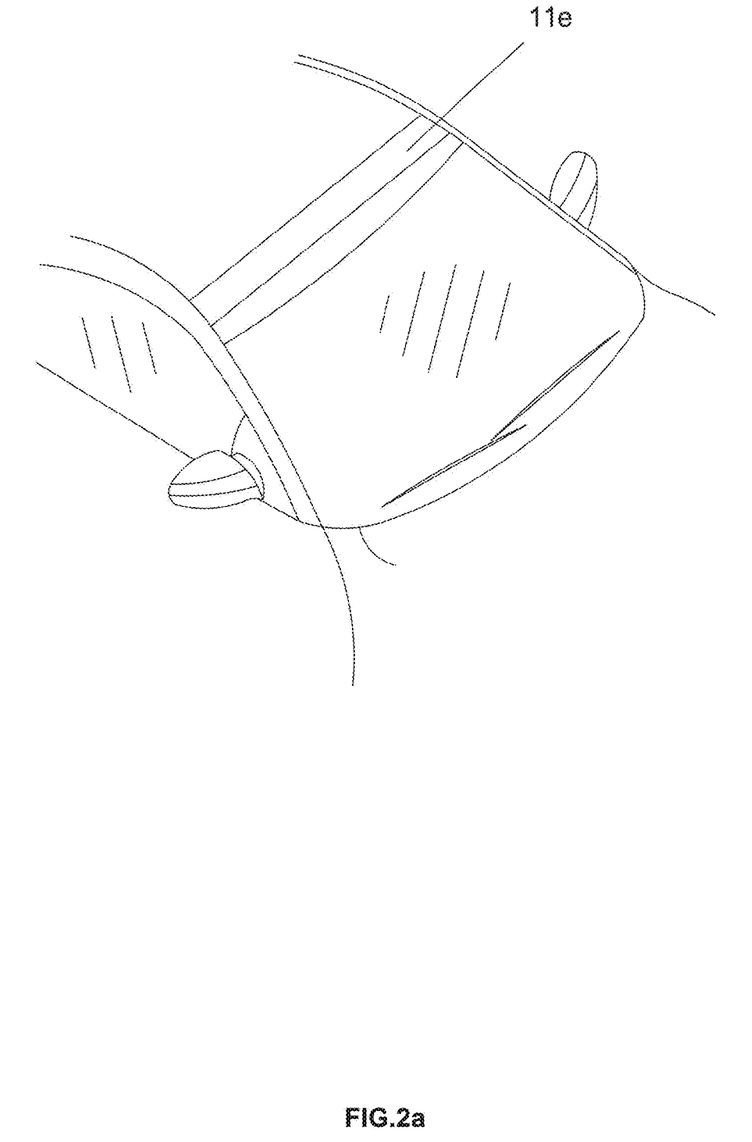
FIG. 2a illustrates a perspective view of an automated vehicle shielding system in a retracted position, configured according to a preferred embodiment of the present invention, wherein such system is installed in a vehicle.
Figure 2B:
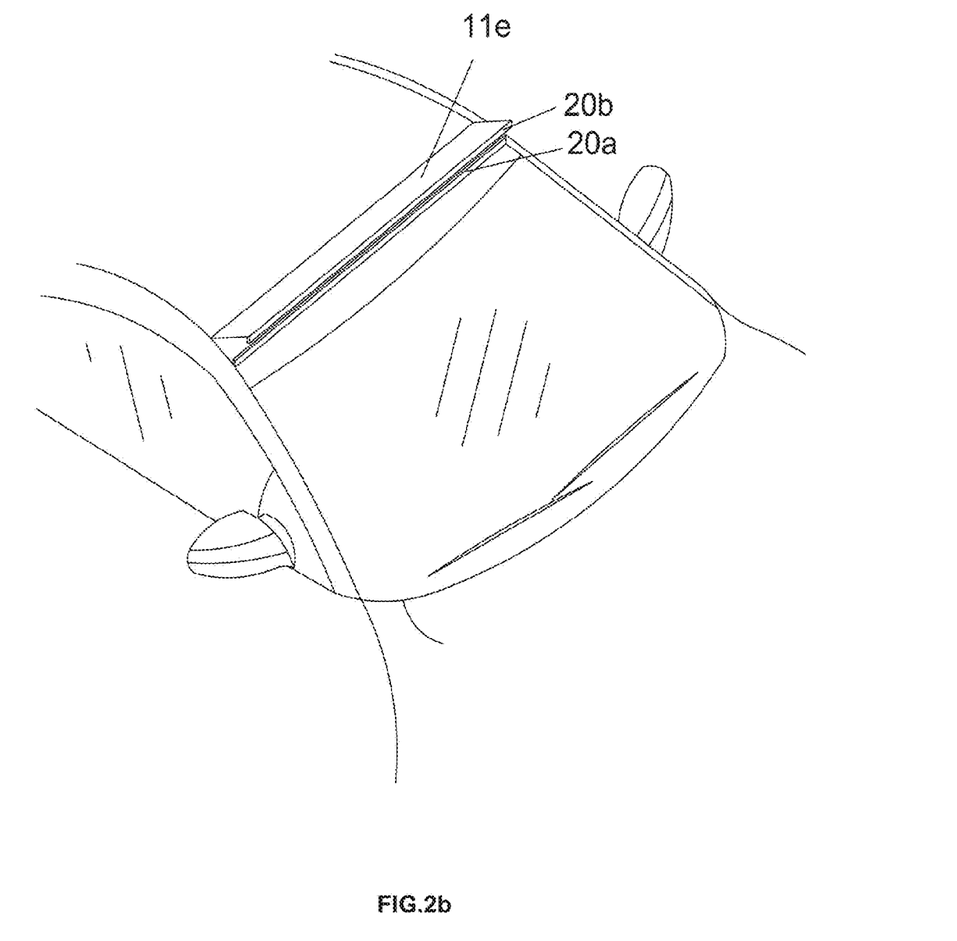
FIG. 2b illustrates a perspective view of an automated vehicle shielding system in a retracted position, configured according to a preferred embodiment of the present invention, wherein such system is installed in a vehicle and wherein a hollow housing wall is alternating from a closed position to an open position.
Figure 3:
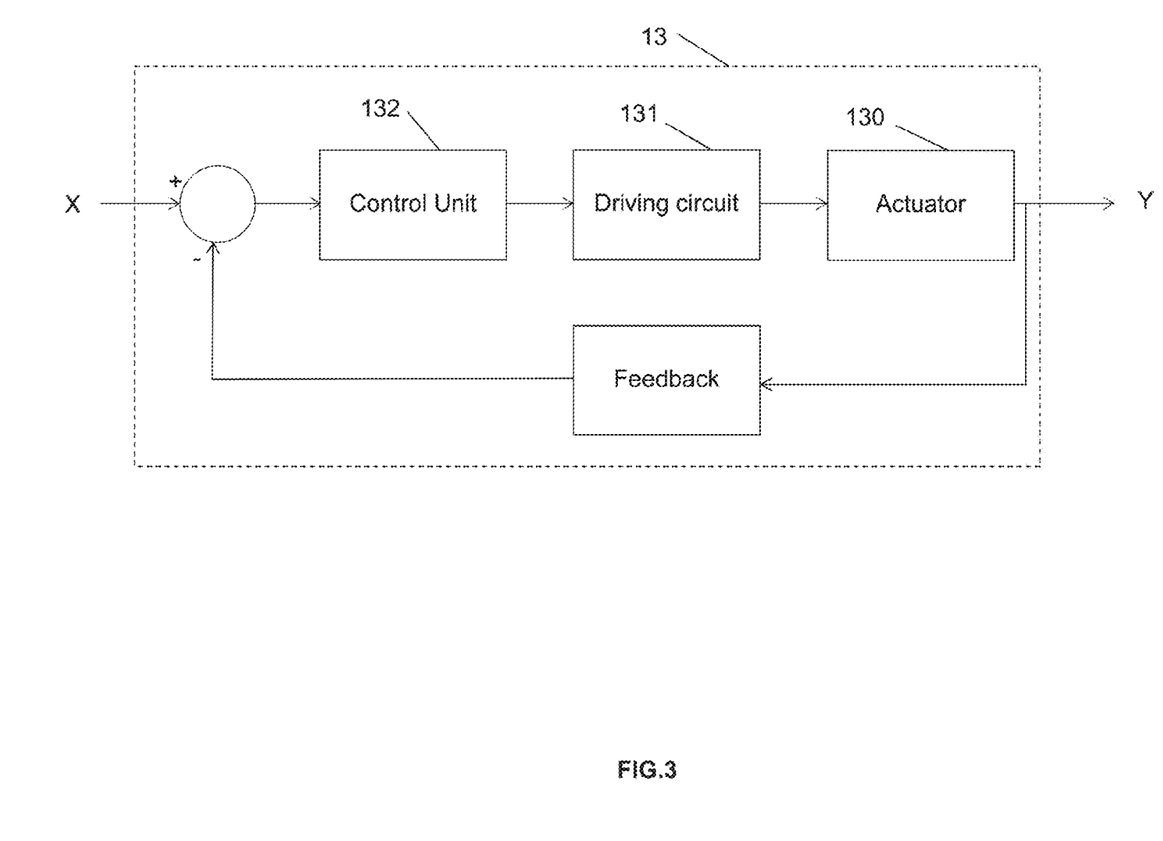
FIG. 3 illustrates a block diagram of an automated vehicle shielding system configured according to a preferred embodiment of the present invention, wherein X represents the input and Y represents the output.

FIGS. 1-3 illustrate a customized vehicle shielding system used for shielding at least a part of a vehicle, configured according to a preferred embodiment of the present invention, wherein such system 1 comprises a hollow housing 10 having an upper portion 100, a lower portion 101, and a plurality of walls 11a, 11b, 11c 11d, 11e, and 11f. In the preferred embodiment of the present invention, at least one wall of the housing walls moves between an open position and a closed position. The system of the present invention also comprises a shielding material 12 adapted to alternate between an extended position and a retracted position; a mechanism for alternating said shielding material between the extended and retracted positions 13; and draining means 14 adapted to drain liquids, wherein such means 14 is positioned at the lower portion 101 of the housing 10. The customized vehicle shielding system of the present invention further comprises means for providing self-cleaning capability.

In the preferred embodiment of the present invention, said mechanism for alternating said shielding material between the extended and retracted positions 13 comprises at least one actuator 130 having a state-of-the-art coupling mechanism, at least one movable member, a state-of-the-art electronic driving circuit 131, and a control unit 132.

In the preferred embodiment, said at least one actuator comprises a Direct Current (DC) motor of any type with suitable state-of-the-art angular or multi-axes displacement sensors.

In another embodiment, said at least one actuator comprises a stepper motor.

In the preferred embodiment, said shielding material 12 has reflective capabilities, solar absorbing capabilities, bulletproofing capabilities and at least one heating element.

The system of the present invention protects shielded area(s) of the vehicle from external conditions, wherein such conditions include but are not limited to weather conditions (rain, dew, snow, sunrays), dust, fired bullets, etc.

The shielding material 12 is configured to be stretchable, durable and reliable in harsh weather conditions, and could be adapted to provide an advertisement space. In addition, said shielding material is configured to be detachable.

In the preferred embodiment, the shielding material 12 comprises a bulletproof material.

In the system of the present invention, said control unit 132 comprises the required state-of-the-art electrical and/or electronic components required to properly operate the system, these components include but are not limited to a controller, a switch to reverse the direction of the actuators' rotation, amplifiers, and receivers.

The system of the present invention is operated by the user remotely through any state-of-the-art communication technology, such as but not limited to Infra-Red (IR), microwave, Bluetooth, Wi-Fi, or telephony networks.

The system of the present invention can be also operated by the user manually in case of electrical malfunction.

In the preferred embodiment, the system of the present invention is adapted to be built-in with the vehicle, wherein said hollow housing 10 is adapted to be installed in an available or potentially available space within the vehicle's structure.

In another embodiment, the system of the present invention is adapted to be added on the vehicle, wherein in such embodiment the system is configured as a spoiler in order to maintain or improve the vehicles' aerodynamic characteristics.

In the preferred embodiment of the present invention, said means for providing self-cleaning capability comprises at least two sweeping members 20a and 20b, one 20a being positioned in said upper portion 100 of said hollow housing 10, and the other 20b is positioned at said at least movable wall 11e of said hollow housing 10, wherein such sweeping members 20a and 20b extend along the length L of said housing Said sweeping members 20a and 20b are configured to be in contact with said shielding material 12 and the at least one movable member when such shielding material is alternating between the extended and retracted positions.

In another embodiment, said means for providing self-cleaning capability comprises at least one sweeping member 20a positioned in said upper portion 100 of said hollow housing 10, wherein such sweeping member 20a extends along the length L of said housing. Said sweeping member 20a is configured to be in contact with said shielding material 12 and the at least one movable member when such shielding material is alternating between the extended and retracted positions.

In another embodiment, said means for providing self-cleaning capability comprises at least one sweeping member 20b positioned in said upper portion 100 of said hollow housing 10, wherein such sweeping member extends along the length L of said housing. Said sweeping member 20b is configured to be in contact with said shielding material 12 and the at least one movable member when such shielding material is alternating between the extended and retracted positions.

In the preferred embodiment, the system of the present invention is adapted to shield the front windshield of the vehicle.

In the preferred embodiment, the system of the present invention is adapted to shield the rear windshield of the vehicle.

In the preferred embodiment, the system of the present invention is adapted to shield the side glass panes of the vehicle.

EXAMPLES

Example 1

Throughout this example, reference will be made to FIGS. 4a-4d with continued reference to FIGS. 1-3.

Figure 4A:
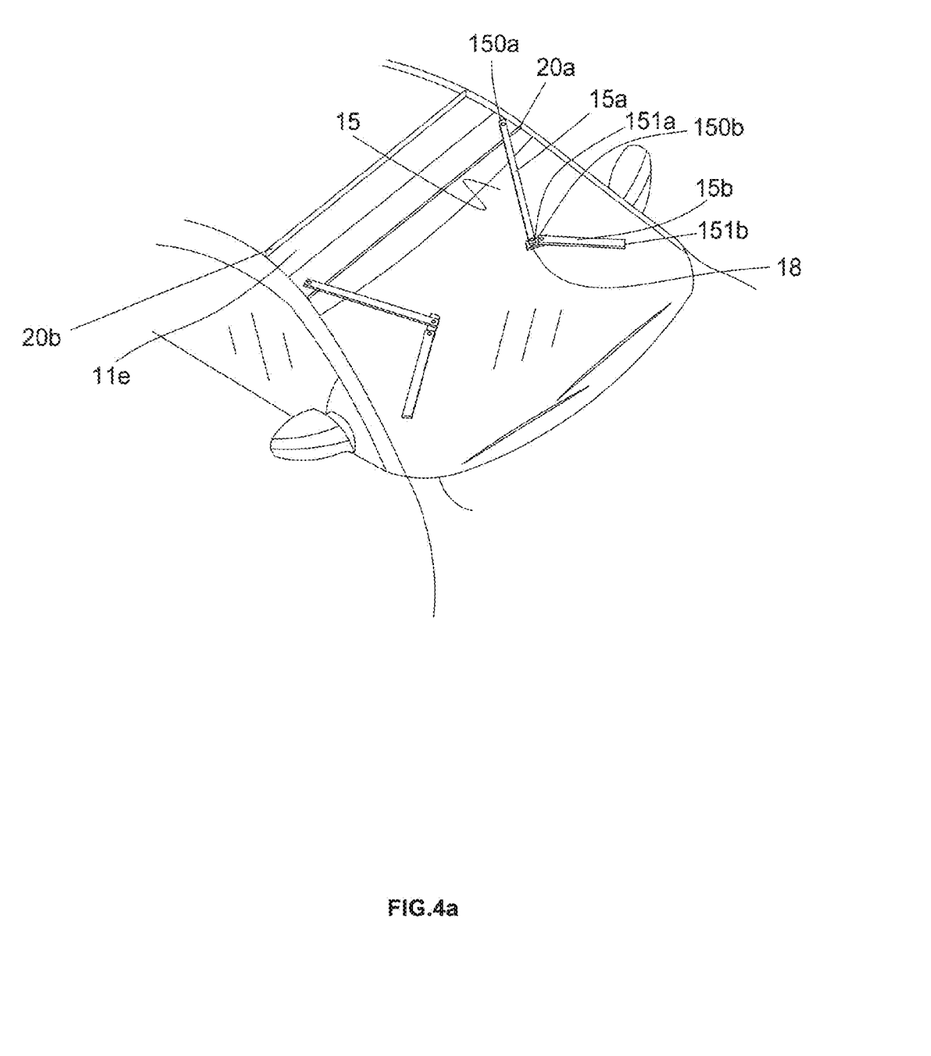
FIG. 4a illustrates a perspective view of an automated vehicle shielding system alternating between a retracted position and an extended position without a shielding material, configured according to a preferred embodiment of the present invention, wherein such system is installed in a vehicle.
Figure 4B:
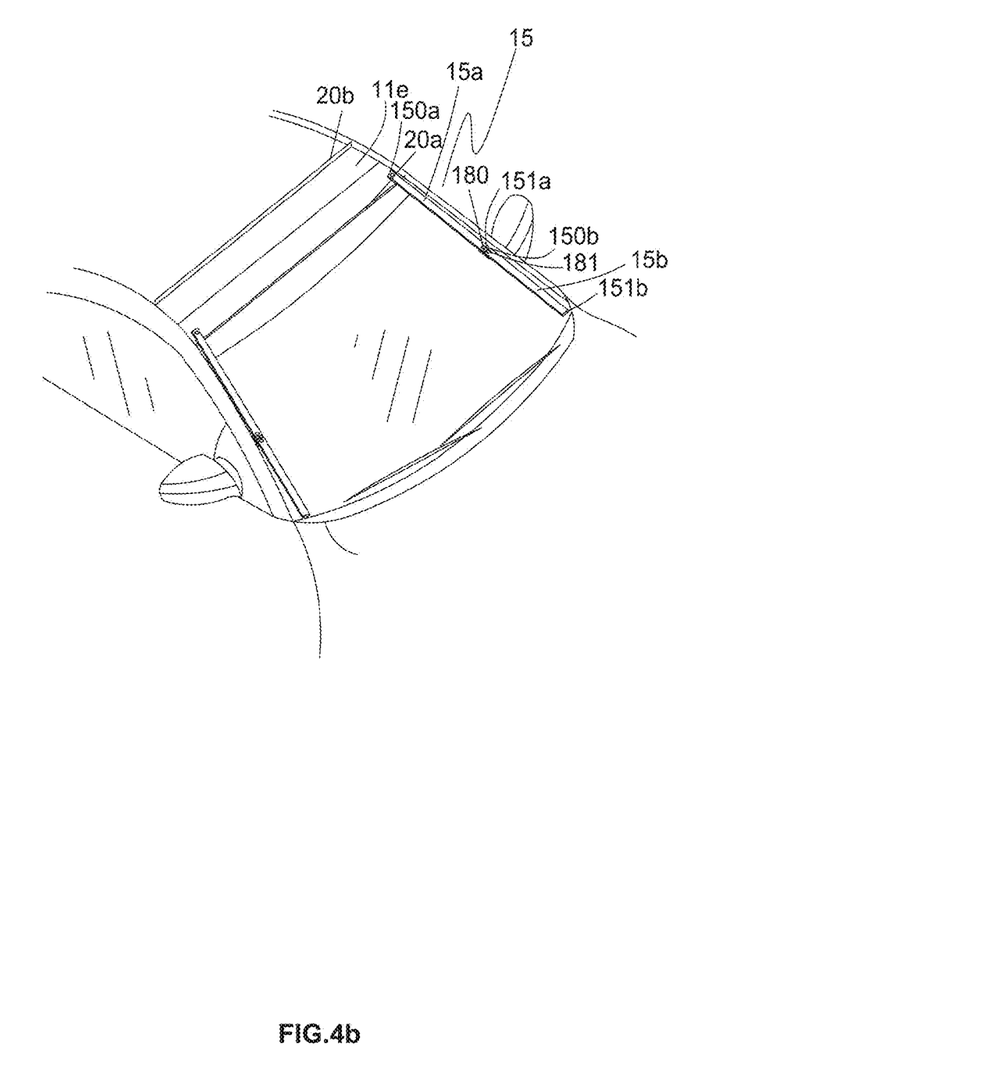
FIG. 4b illustrates a perspective view of an automated vehicle shielding system being in an extended position without a shielding material, configured according to a preferred embodiment of the present invention, wherein such system is installed in a vehicle.
Figure 4C:
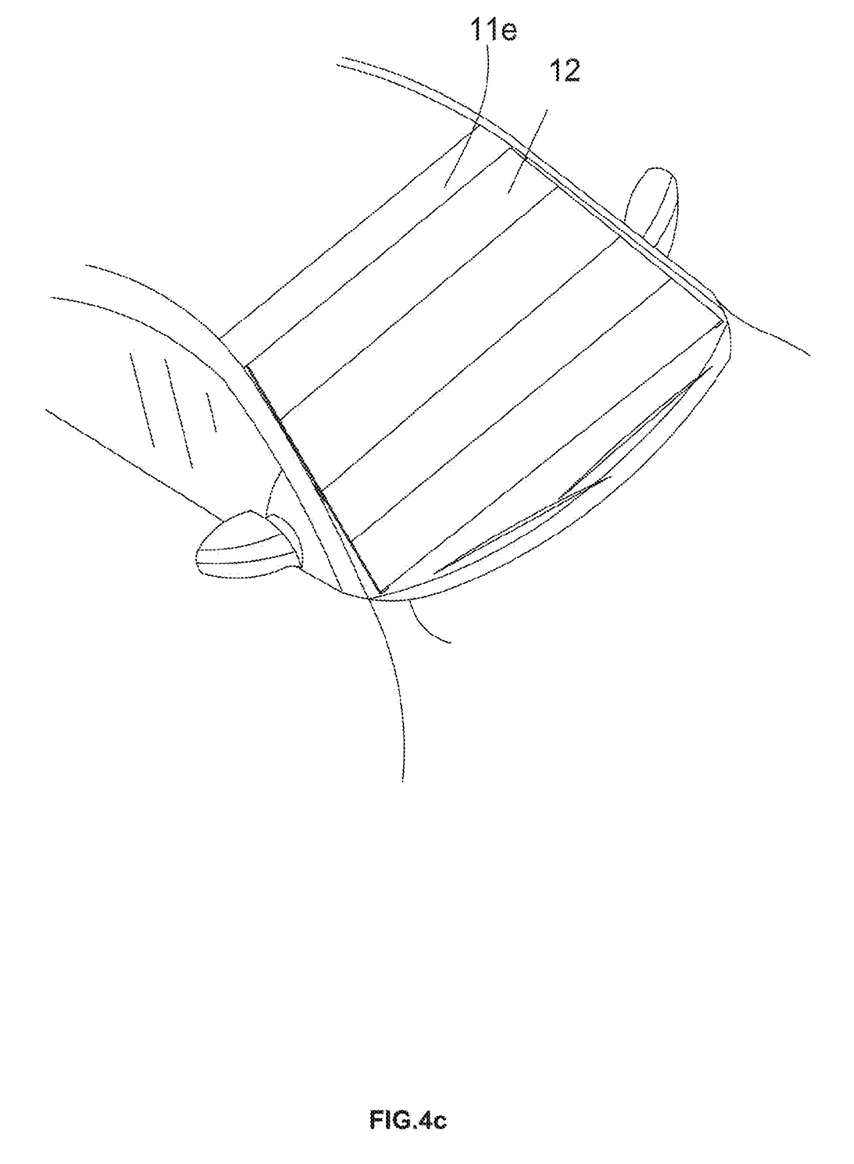
FIG. 4c illustrates a perspective view of an automated vehicle shielding system being in an extended position with a shielding material, configured according to a preferred embodiment of the present invention, wherein such system is installed in a vehicle.
Figure 4D:
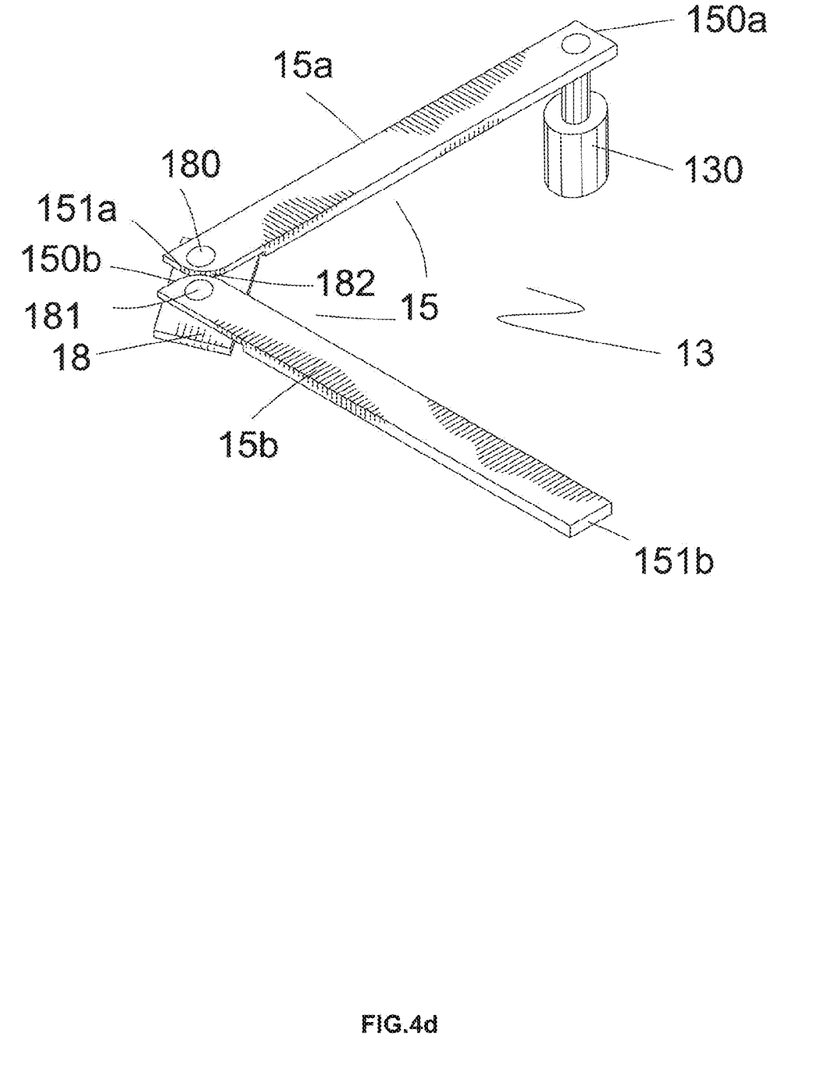
FIG. 4d illustrates a perspective view of a pair of links of an automated vehicle shielding system configured according to a preferred embodiment of the present invention.

In one example, said at least one movable member comprises at least one pair of links 15 comprising a first link member 15a having a first end 150a and a second end 151a, and a second link member 15b having a first end 150b and a second end 151b.

The first end 150a of the first link member 15a is connected to the at least one actuator 130 through the coupling mechanism, wherein such mechanism should allow said first link member 15a to have at least two degrees of freedom relative to the housing 10.

In the current example, the first link member 15a can translate towards and away from the hollow housing 10 and rotate relative to the such housing 10.

In another example, the first link member 15a can translate towards and away from the hollow housing 10, tilt and rotate relative to such housing 10.

The first link member 15a and the second link member 15b are connected to each other by means of a connecting link member 18.

The second end 151a of the first link member and the first end 150b of the second link member 15b are connected to the connecting link member 18 by single degree of freedom joints 180 and 181 respectively, such as but not limited to pin joints.

The relative movement of the first and second link members 15a and 15b is confined and controlled by a plurality of teeth 182 configured on the second end 151a of the first link member and the first end 150b of the second link member.

The at least one actuator 130 along with the coupling mechanism are adapted to translate the at least one pair of links 15 towards and away from the housing 10, wherein such translation allows said first and second link members 15a and 15b, to move away from the vehicle's body in order to maintain an unoccupied space between the vehicle's body and the link members 15a and 15b, thus avoiding damage, such as scratches, to the vehicle's body.

Said actuator 130 along with the coupling mechanism rotate said at least one pair of links 15 from a retracted position to reach a partially-extended or optionally fully-extended position, wherein the retracted position is defined by an angle of 0 between the link members 15a, 15b and the length L of the housing 10, and wherein the fully-extended position is defined by the an angle of 180 between the link members 15a, 15b and the length L of the housing 10. The partially-extended position is defined when the first link member 15a and the second link member 15b form a straight line with its projection being perpendicular to the housing 10.

At least one part of the shielding material 12 is connected to the at least one pair of links 15 using any suitable state-of-the-art technique, whereby the shielding material 12 is extended and stretched when the at least one pair of links 15 is in the partially or fully-extended position, and whereby the shielding material 12 is retracted by folding or rolling when the at least one pair of links 15 is in the retracted position.

The tilt angle of the first link member 15a with respect to the housing 10 is a factor of the size of the housing 10, the size of the vehicle, and the area to be shielded.
End of Example 1

Example 2

Figure 5A:
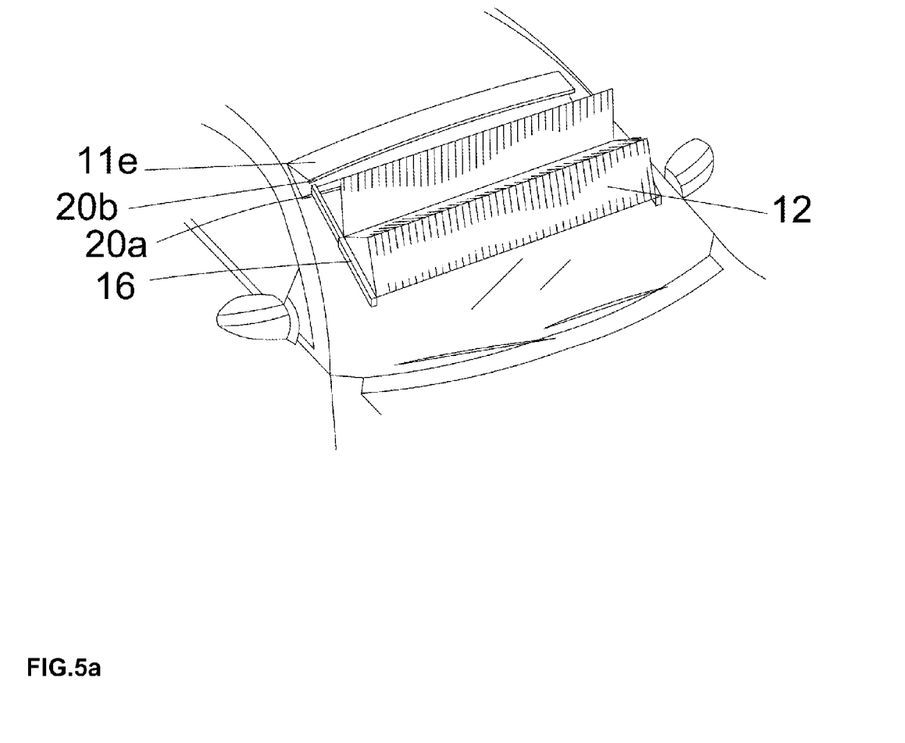
FIG. 5a illustrates a perspective view of an automated vehicle shielding system just started alternating between a retracted position and an extended position with a shielding material, configured according to a preferred embodiment of the present invention, wherein such system is installed in a vehicle.
Figure 5B:
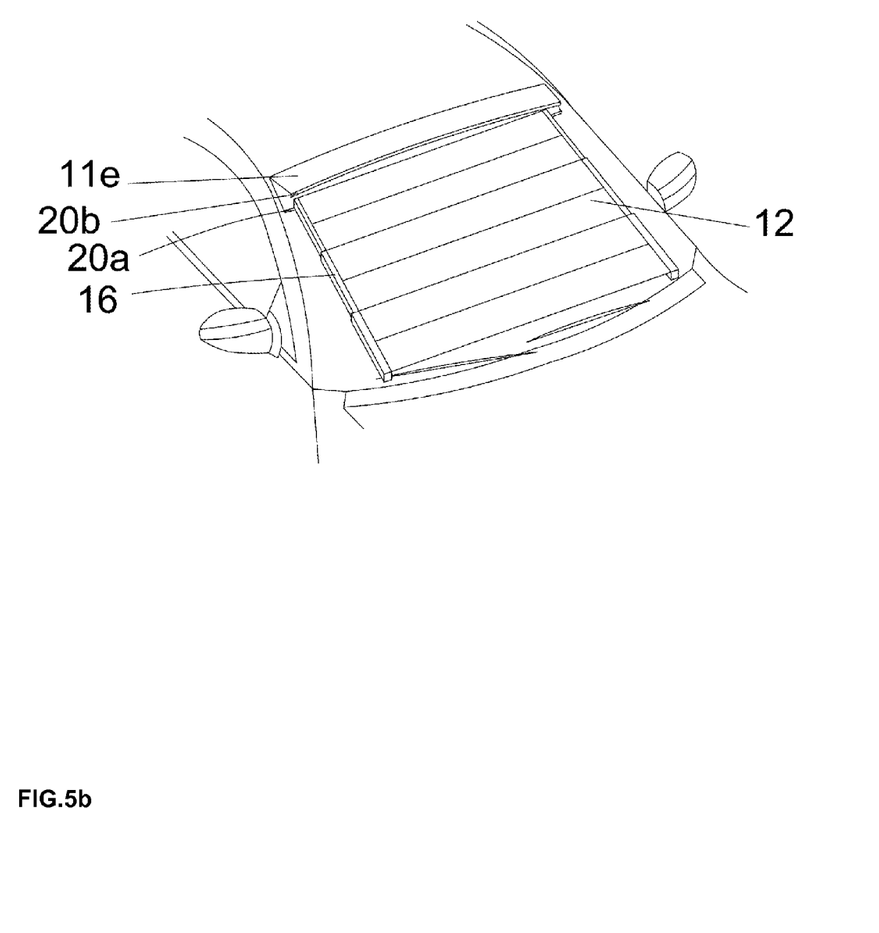
FIG. 5b illustrates a perspective view of an automated vehicle shielding system alternating between a retracted position and an extended position with a shielding material, configured according to a preferred embodiment of the present invention, wherein such system is installed in a vehicle.
Figure 5C:
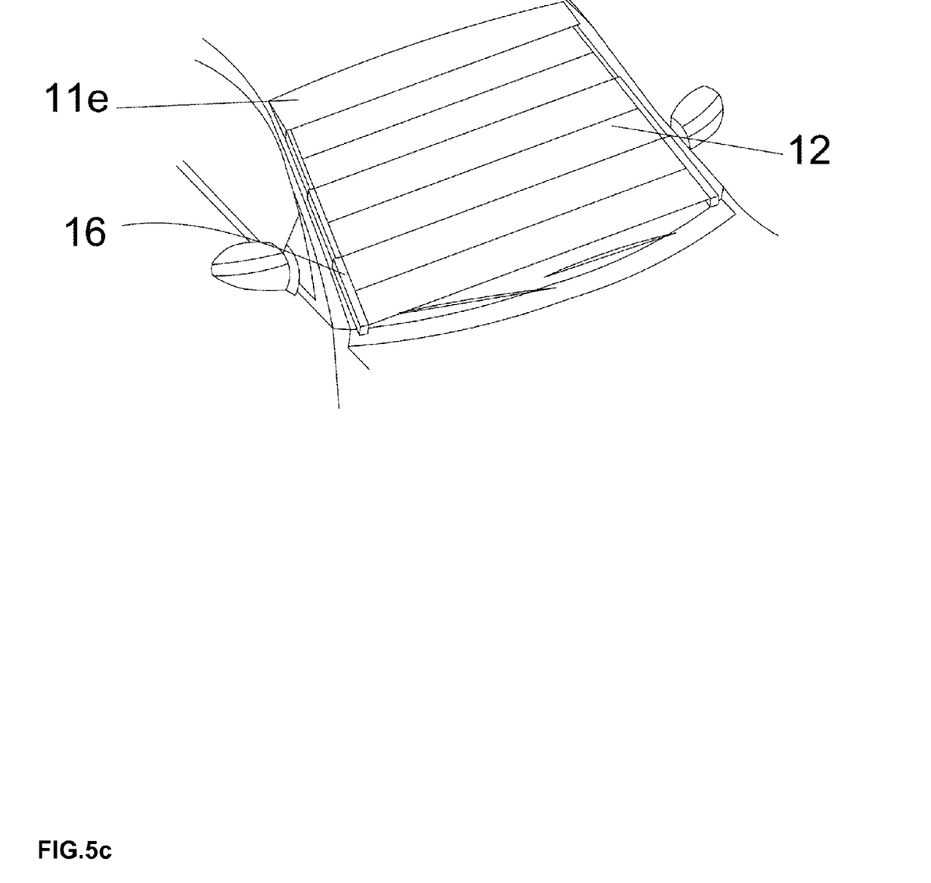
FIG. 5c illustrates a perspective view of an automated vehicle shielding system being in an extended position with a shielding material, configured according to a preferred embodiment of the present invention, wherein such system is installed in a vehicle.

Throughout this example, reference will be made to FIGS. 5a-5c with continued reference to FIGS. 1-3.

In another example, said at least one movable member comprises at least one telescoping member 16, wherein such telescoping member alternates between an extended position and a retracted position, wherein said extended position is defined as the position in which the shielding material is covering the desired part of the vehicle's body, and wherein said retracted position is defined as the position in which the at least one telescoping member 16 and the shielding material 12 are enclosed in the housing 10.

Said at least one actuator 130 along with the coupling mechanism are adapted to translate the said telescoping member along at least a part of the housing length L.

The at least one actuator 130 along with the coupling mechanism are adapted to translate the at least one telescoping member 16 towards and away from the housing 10, wherein such translation allows said at least one telescoping member to move away from the vehicle's body in order to maintain an unoccupied space between the vehicle's body and the telescoping member 16, thus avoiding damage, such as scratches, to the vehicle's body.
End of Example 2

Example 3

Figure 6A:
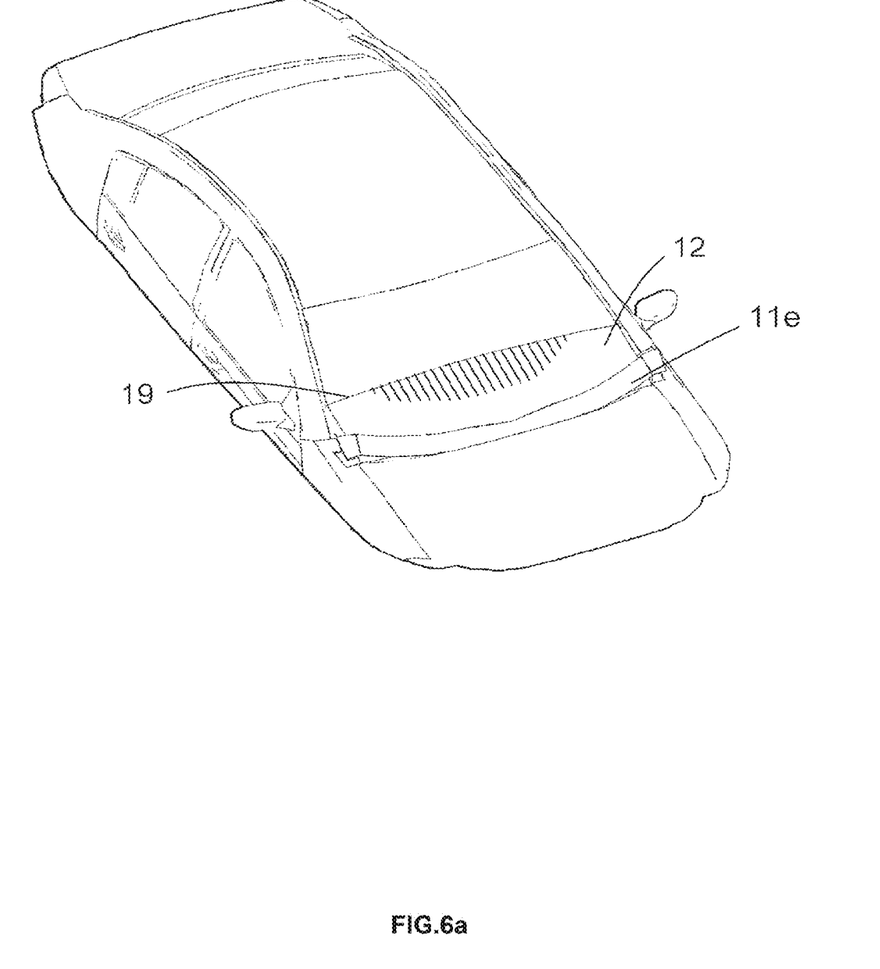
FIG. 6a illustrates a perspective view of an automated vehicle shielding system just started alternating between a retracted position and an extended position, configured according to a preferred embodiment of the present invention, wherein such system is installed in a vehicle.
Figure 6B:
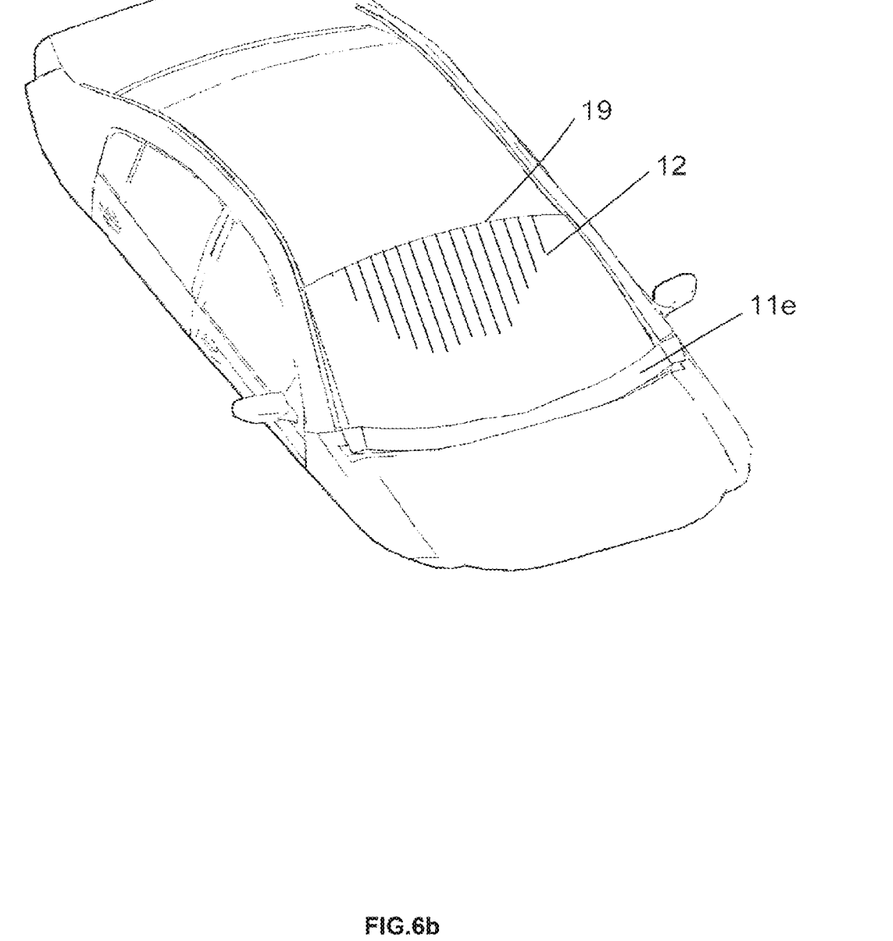
FIG. 6b illustrates a perspective view of an automated vehicle shielding system alternating between a retracted position and an extended position with a shielding material, configured according to a preferred embodiment of the present invention, wherein such system is installed in a vehicle.
Figure 6C:
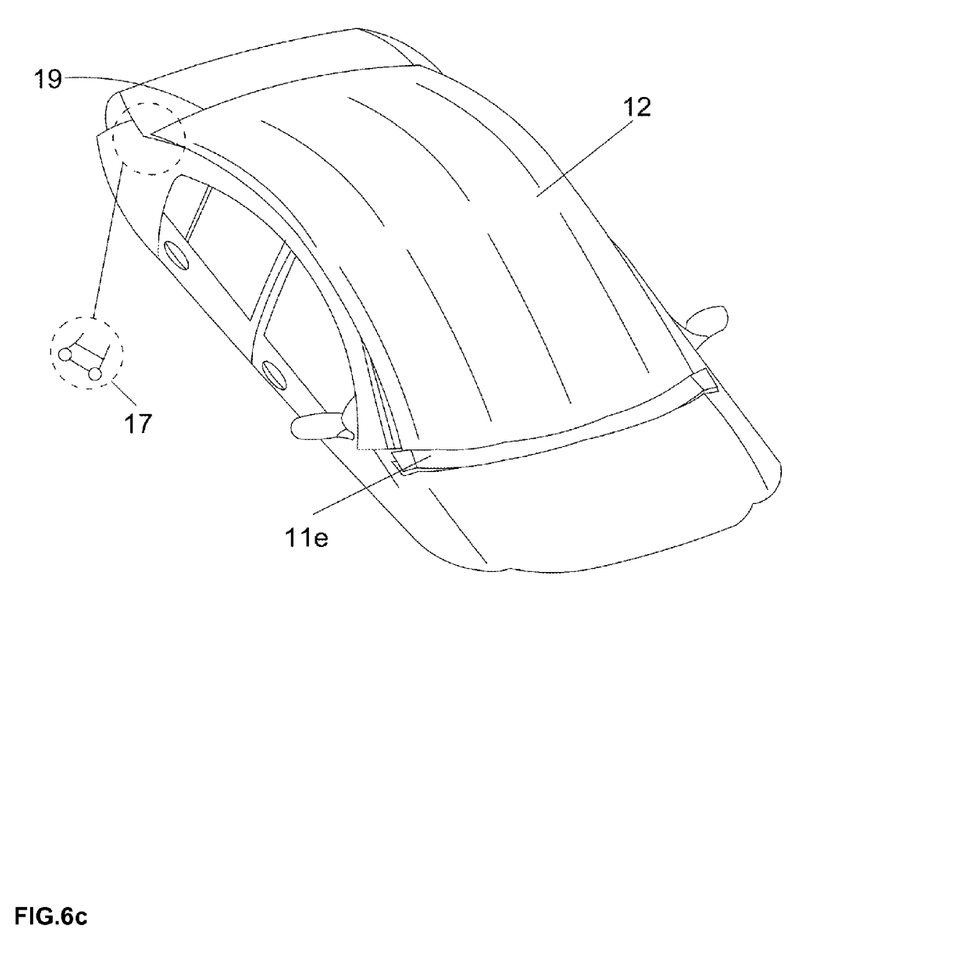
FIG. 6c illustrates a perspective view of an automated vehicle shielding system being in an extended position with a shielding material, configured according to a preferred embodiment of the present invention, wherein such system is installed in a vehicle.

Throughput this example, reference is made to FIGS. 6a-6c, with continued reference to FIGS. 1-3.

Yet in another example, said at least one movable member comprises at least one disc or ring-shaped member 17, wherein such member 17 is connected to said at least one actuator 130. Said at least one actuator 130 along with the coupling mechanism are adapted to roll said at least one disc or ring-shaped member 17 along the portion of the vehicle to be shielded.

In case there is a plurality of members 17, a flexible member 19 is used to connect between said members 17.

End of Example 3

End of Examples

While the present invention has been described in details and with reference to specific embodiments thereof, it will be apparent to one skilled in the art that various additions, omissions and modifications can be made without departing from the spirit and scope thereof.

Although the above description contains many specificities, these should not be construed as limitations on the scope of the invention but is merely representative of the presently preferred embodiments of this invention. The embodiment(s) of the invention described above is (are) intended to be exemplary only. The scope of the invention is therefore intended to be limited solely by the scope of the appended claims.

What is claimed is:

1. A customized vehicle shielding system for installation in vehicles, comprising:
   a customized hollow housing installed in a space, wherein said housing has an upper portion, a lower portion and a plurality of walls;
   a shielding material adapted to alternate between an extended position and a retracted position;
   a mechanism for extending and retracting said shielding material;
   a draining means; and
   means for providing self-cleaning capability, characterized in that
   said housing has at least one movable wall, and in that said space is
      within the structure of said vehicle; or
      on the structure of said vehicle; and
   said shielding material contains:
      reflective capabilities;
      solar absorbing capabilities;
      bulletproofing capabilities; and
      at least one heating element.

2. The system of claim 1, wherein said system maintains or improves said vehicle's aerodynamics.

3. The system of claim 1, wherein said housing encloses said shielding material and said mechanism for extending and retracting said shielding material.

4. The system of claim 1, wherein said shielding material is detachable.

5. The system of claim 1, wherein the shielding material provides an advertising space.

6. The system of claim 1, wherein the said mechanism is activated automatically.

7. The system of claim 1, wherein said mechanism is activated remotely.

8. The shielding system of claim 1, wherein said mechanism is activated manually.

9. The shielding system of claim 1, wherein said draining means is positioned at said lower portion of said housing.

10. The shielding system of claim 1, further characterized in that said means for providing self-cleaning capability comprises at least one sweeping member, and wherein
    said at least one sweeping member extends along the length of said hollow housing; and
    said at least one sweeping member is adapted to be in contact with said shielding material and said mechanism for extending and retracting said shielding material when said shielding material is alternating between the extended and retracted positions.

11. The shielding system of claim 10, further characterized in that said at least one sweeping member is positioned at said upper portion of said hollow housing.

12. The shielding system of claim 11, further characterized in that said at least one sweeping member is positioned at said at least one movable wall of said hollow housing.

13. The shielding system of claim 1, further characterized in that said means for providing self-cleaning capability comprises at least two sweeping members, and wherein said at least two sweeping members
    extend along the length of said hollow housing; and
    are adapted to be in contact with said shielding material and said mechanism for extending and retracting said shielding material when said shielding material is alternating between the extended and retracted positions.

14. The shielding system of claim 13, further characterized in that one of said at least two sweeping members is positioned at said upper portion of said hollow housing, and wherein the other one of said at least two sweeping members is positioned at said at least one movable wall of said hollow housing.

* * * * *